2,795,308

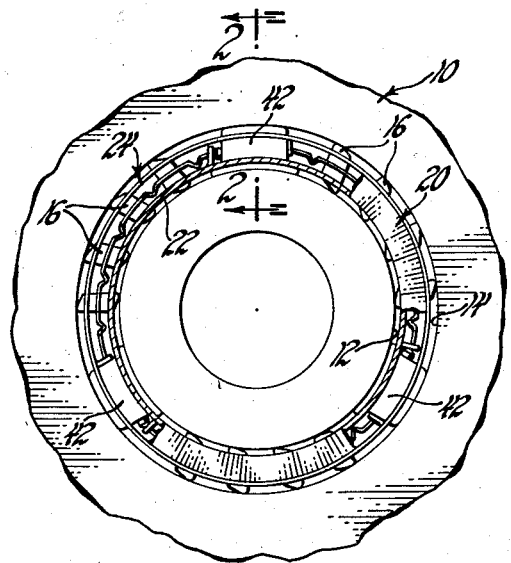
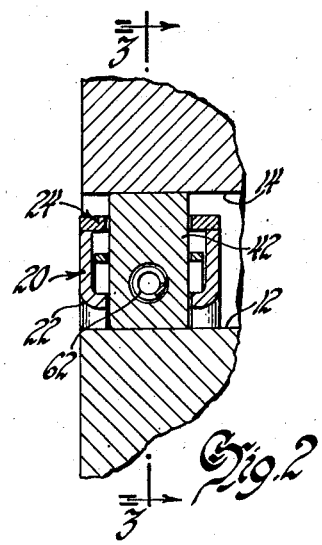
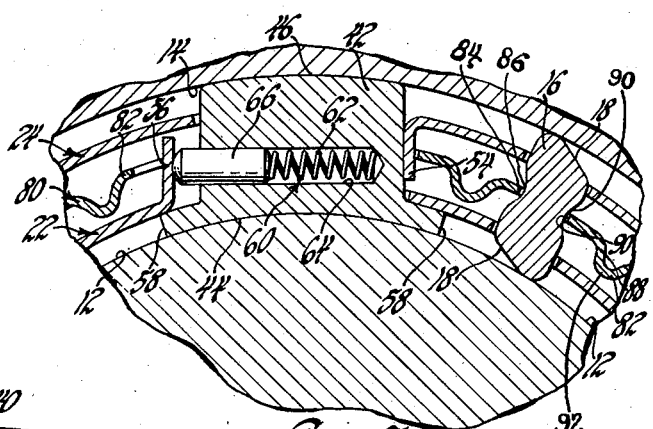

SPRAG CLUTCH

Clyde G. Hayden, Bristol, Conn., assignor to General Motors Corporation, Detroit, Mich., a corporation of Delaware Application February 18, 1954, Serial No. 412,756

9 Claims. (Cl. 192—45.1)

The present invention relates to sprag clutches and more particularly to cages for positioning the sprags for movement into and out of engagement with a pair of substantially cylindrical races.

In the operation of sprag clutches, it is desirable that the sprags be properly positioned so that the ends thereof will engage the races at all times. Also it is desirable that all of the sprags move simultaneously whenever they move into and out of locking engagement with the races. Cage means may be provided wherein the inner and outer cages have registering openings therethrough for receiving the sprags. The openings may position the sprags circumferentially between the races with the opposite ends of the sprags projecting from the cages to engage the races. Relative rotation of the cages may cause all of the sprags to simultaneously rotate into or out of locking engagement with the races. This will prevent failure of the clutch as a result of a relatively small number of sprags prematurely absorbing the entire load.

It is now proposed to provide spring means for biasing the cages of a sprag clutch in circumferentially opposite directions to each other. This will cause the cages to apply a resilient couple to the sprags and bias them against the races. This may be accomplished by employing a plurality of members that are disposed between the races and carry spring means that engage the cages and bias them in circumferentially opposite directions. The spring is preferably tensioned to rotate the cages in a direction which will move the sprags toward locking engagement with the races.

Although the sprags in a one way sprag clutch may wedge between the races and transmit torque from one race to the other, the sprags are not capable of withstanding a bearing load. It is therefore necessary to employ external bearing means to support the races in concentric relation.

It is now proposed to provide a one way sprag clutch having a plurality of bearing members disposed between the races for retaining the races substantially concentric. These bearing members may be provided with bearing surfaces that may slide on the same races provided for the sprags. The bearing members may withstand radial loads and will therefore retain the races substantially concentric at all times.

It has been found that during the operation of a sprag clutch which employs cage means for positioning the sprags, it is desirable that the cages be maintained concentric with the races at all times. If the cages are eccentric to the races when the sprags move into or out of wedging engagement with the races, the cages will cause the sprags to be misplaced, and when the sprags move into or out of locking engagement with the races, it will be necessary for the sprags to move the cages concentric with the races. Thus the cages will interfere with the operation of the sprags.

It is now proposed to provide a plurality of members disposed between the races for retaining the cages centered at all times. The members may be provided with shoulders that engage the cages and retain them equally spaced from the races at all times.

In the one sheet of drawings:

Fig. 1 is a side elevation of a sprag clutch embodying the present invention.

Fig. 2 is a fragmentary cross sectional view taken substantially along the plane of line 2—2.

Fig. 3 is a fragmentary cross sectional view taken substantially along the plane of line 3—3 in Fig. 2.

Fig. 4 is a fragmentary perspective view of the cage means with a portion thereof being broken away.

Referring to the drawings in more detail, the present invention may be embodied in any suitable one way clutch 10 adapted to be disposed between a substantially cylindrical inner race 12 and a substantially cylindrical outer race 14 disposed in spaced concentric relation therewith. In the present instance the clutch 10 is of the so-called "sprag" type wherein a plurality of substantially identical tiltable grippers or sprags 16 are adapted to be disposed in circumferentially spaced relation between the inner and outer races 12 and 14. Each of the sprags 16 are disposed in a nearly radial position about the axis of rotation. The inner and outer ends of the sprags may be provided with cam surfaces 18 that are positioned to engage the races 12 and 14. The cam surfaces 18 are disposed so that one diagonal of the sprags 16 is not only longer than the other diagonal but also longer than the space between the two races 12 and 14. The cam surfaces 18 are adapted to be held in engagement with the races 12 and 14 so that when the outer race 14 rotates counterclockwise or in a non-driving direction relative to the inner race 12, the cam surfaces 18 will merely slide on the races 12 and 14 but when the outer race 14 rotates clockwise in a driving direction relative to the inner race 12, the sprags 16 will tilt so that the longer diagonal of each sprag is more nearly radial and the sprags 16 are wedged between the inner and outer races 12 and 14. Thus when the outer race 14 rotates counterclockwise relative to the inner race 12, it will overrun the inner race 12, but when it rotates clockwise relative thereto, the sprags 16 will be in a wedged positon and transmit torque from one race to the other.

In order to retain the sprags properly positioned at all times, cage means 20 may be disposed between the races 12 and 14. In the present instance the cage means 20 include an inner cage 22 and an outer cage 24 which are relatively rotatable to each other.

The inner cage 22 includes a substantially cylindrical base portion 26 which is disposed adjacent the inner race 12. The diameter of this base portion 26 is preferably slightly larger than the diameter of the inner race 12 so that the inner cage 22 may be disposed in spaced concentric relation to the inner race 12. A pair of radial flanges 28 and 30 may be formed on the opposite sides of the base portion 26 so as to project toward the outer race 14. The peripheries 32 and 34 of the flanges 28 and 30 are preferably substantially circular and uniformly spaced from the outer race 14. A plurality of openings 36 may be spaced circumferentially around the base portion 26 for receiving the sprags 16 so that the cam surfaces 18 on the inner ends thereof may engage the inner race 12. These openings 36 are preferably only slightly larger than the width of the sprags 16 and provide a minimum amount of clearance between the sprags 16 and the edges of the openings 36. Thus there will be a minimum amount of relative movement between the sprags 16 and the inner cage 22.

The outer cage 24 may include a cylindrical member 38 that has a diameter only slightly larger than the peripheries 32 and 34 of the flanges 28 and 30 and smaller than the outer race 14. Thus the outer cage 24 may be slidably supported on the peripheries 32 and 34 of the flanges 28 and 30. It can be seen that the outer cage 24, which is relatively rotatable to the inner cage 22, will always be retained concentric with the inner cage 22 by means of the flanges 28 and 30. The outer cage 24 may be provided with a plurality of openings 40 that are positioned to register with those in the base 26 of the inner cage 22 for permitting the outer ends of the sprags 16 to project against the outer race 14. These openings 40 are preferably similar to those in the inner cage 22 as they are a close fit around the sprags 16 and permit a minimum amount of relative movement between the outer cage 24 and the sprags 16.

In order to support the cages 22 and 24 in spaced relation to the races 12 and 14, a plurality of bearing members 42, three in the present instance, may be disposed between the races 12 and 14. The radially inner and outer ends 44 and 46 of these members 42 may have substantially arcuate surfaces thereon that are adapted to slide on the inner and outer races 12 and 14. Although these arcuate surfaces may be formed to create an oil wedge between the bearing members 42 and the races 12 and 14, the members 42 should have sufficient concentric bearing surfaces thereon to prevent them becoming axially misaligned with respect to the races 12 and 14. It can thus be seen that as the races 12 and 14 slide on these rigid bearing members 42, they can absorb radial loads and thus serve as bearings to retain the races 12 and 14 substantially concentric at all times.

The cage means 20 may be supported by the bearing members 42 so as to be concentric with the races 12 and 14 at all times. In the present instance each of the bearing members 42 are positioned in a pair of elongated registering openings 50 and 52 in the cages 22 and 24 so that the ends radially project beyond the cages. Flanges 54 may be provided on the outer cage 24 to project radially inwardly from one end of each opening 50 adjacent one end of each of the bearing members 42. Flanges 56 may also be provided on the inner cage 22 to project radially outwardly adjacent the other ends of the openings 52 along the opposite ends of the bearing members 42. Thus the bearing members 42 will be disposed between the two flanges 54 and 56. The inner ends 44 of each bearing member 42 may be provided with shoulders 58 that project circumferentially under the inner cage 22 and hold it spaced from the inner race 12. Since there are a plurality of equally spaced bearing members 42, the inner cage 22 will be retained concentric with the races 12 and 14. Also since the outer cage 24 is carried on the flanges 28 and 30, both cages 22 and 24 will be concentric at all times.

Spring means 60 may be provided in one or more of the bearing members 42 for biasing the cages 22 and 24 in circumferentially opposite directions. Since the edges of the openings 36 and 40 in the cages 22 and 24 engage the sprags 16 at radial different points, any relative rotation of the cages 22 and 24 will tilt the sprags 16. Thus it is possible to simultaneously move the sprags 16 into or out of engagement with the races 12 and 14 by rotating the cages 22 and 24 relative to each other. Accordingly, it has been found desirable to employ spring means 60 on the bearing members 42 for resiliently biasing the cages 22 and 24 in opposite directions.

In the present instance a spring 62 is disposed in a passage 64 in each of the bearing members 42. A plunger 66 is slidably disposed in each passage 64 so that one end engages a spring 62 and the other end engages a flange 56. Thus the springs 62 will urge the flanges 54 and 56 apart and bias the outer cage 24 clockwise relative to the inner cage 22. This in turn will tilt the sprags 16 clockwise and place the cam surfaces 18 against the races 12 and 14.

It may be seen that when the outer race 14 rotates clockwise relative to the inner race 12, the sprags 16 will move into wedging engagement with the races 12 and 14. Such movement of the sprags 16 will cause the outer cage 24 to move clockwise relative to the inner cage 22. Since the spring means 60 in the bearing members 42 will tend to urge the cages 22 and 24 in this direction, the sprags 16 will not have to supply the energy for moving the cages 22 and 24. Thus the inertia of the cages 22 and 24 will not interfere with the rapid movement of the sprags 16 into locking engagement.

If it is desired to provide additional resilience for urging the sprags against the races 12 and 14, additional spring means 80 may be provided between the cages 22 and 24. In the present instance a plurality of sheet metal springs 82 are employed. Each spring 82 is a strip of resilient material that extends between adjacent bearing members 42 and has a plurality of windows 84 therein for receiving the sprags 16. One side of each window engages a groove 86 in a sprag 16 while the other side forms a resilient tab 88 that fits into a groove 90 on the other side of the sprag 16. The tab 88 may be spring biased to urge the cam surfaces 18 against the races 12 and 14. The portions of the spring forming the windows 84 are resiliently deformable so that the sprags 16 may be demountably snapped therein in unit-handling assembly with the cages 22 and 24. Also, looped portions 92 of the spring 82 at opposite sides of each sprag may engage the inner cage wall 26 to loosely but radially locate the springs 82 and sprags 16.

It is to be understood that, although the invention has been described with specific reference to a particular embodiment thereof, it is not to be so limited since changes and alterations therein may be made which are within the full intended scope of this invention as defined by the appended claims.

What is claimed is:

1. A one way clutch adapted to be disposed between a pair of coaxial races, said clutch comprising a pair of relatively rotatable cages adapted to be disposed concentrically between said races, each of said cages having a set of circumferentially spaced openings therein positioned to register with corresponding openings in the other of said cages, sprags disposed in said registering openings with the opposite ends thereof projecting from said cages for engaging said races, and bearing members slidably extending through both cages and spaced circumferentially between said races with the opposite ends thereof slidably engaging said races, said bearing members having spring actuated members movable therein and engaging one of the cages and resiliently urging said cages in circumferentially opposite directions.

2. A one way clutch adapted to be disposed between a pair of coaxial races, said clutch comprising a pair of relatively rotatable cages adapted to be disposed concentrically between said races, each of said cages having a set of circumferentially spaced openings therein positioned to register with the openings in the other of said cages, sprags disposed in said registering openings with the opposite ends thereof projecting from said cages for engaging said races, bearing members circumferentially spaced to slidably engage said races and support at least one of said cages concentric with said races, and spring means carried by said bearing members for biasing said cages in circumferentially opposite directions.

3. A one way clutch adapted to be disposed between a pair of coaxial races, said clutch comprising a pair of relatively rotatable cages adapted to be disposed concentrically between said races, each of said cages having a set of circumferentially spaced openings therein positioned to register with the openings in the other of said cages, sprags disposed in said registering openings with the opposite ends thereof projecting from said cages for engaging said races, said cages having a second set of circumferentially spaced registering openings therein, bearing members disposed in said second set of registering openings with the opposite ends thereof projecting from said cages for slidably engaging said races, and spring means carried by said bearing members for biasing said cages in circumferentially opposite directions.

4. A one way clutch adapted to be disposed between a pair of coaxial races, said clutch comprising a pair of relatively rotatable cages adapted to be disposed concentrically between said races, each of said cages having a set of circumferentially spaced openings therein positioned to register with the openings in the other of said cages, sprags disposed in said registering openings with the opposite ends thereof projecting from said cages for engaging said races, said cages having a second set of circumferentially spaced registering openings therein, bearing members disposed in said second set of registering openings with the opposite ends thereof projecting from said cages for slidably engaging said races, and spring means carried by said bearing members for biasing said cages in circumferentially opposite directions, and shoulder means on said bearing members engaging at least one of said cages for supporting said cage concentric with said races.

5. A one way clutch adapted to be disposed between a pair of coaxial races, said clutch comprising a first cage having a cylindrical base portion and a pair of radial flanges projecting from the opposite sides of said base portion, a second cage concentric with said first cage carried on said flanges, said base portion and said second cage having registering openings therein, sprags disposed in said openings with the opposite ends thereof projecting from said cages for engaging said races, said base portion and said second cage having a second set of registering openings, bearing members disposed in said second set of openings with the opposite ends thereof projecting from said cages for slidably engaging said races, and spring means carried by said bearing members for biasing said cages in circumferentially opposite directions.

6. A one way clutch adapted to be disposed between a pair of coaxial races, said clutch comprising a first cage having a cylindrical base portion and a pair of radial flanges projecting from the opposite sides of said base portion, a second cage concentric with said first cage carried on said flanges, said base portion and said second cage having registering openings therein, sprags disposed in said openings with the opposite ends thereof projecting from said cages for engaging said races, said base portion and said second cage having a second set of registering openings, bearing members disposed in said second set of openings with the opposite ends thereof projecting from said cages for slidably engaging said races, shoulder means on said bearing members engaging one of said cages for carrying said cages concentric with said races.

7. A one way clutch adapted to be disposed between a pair of coaxial races, said clutch comprising an inner cage having a cylindrical base portion adapted to be disposed adjacent one of said races, a pair of flanges projecting radially outwardly from the opposite sides of said base portion, an outer cage concentric with and relatively rotatable to said inner cage carried on said flanges adjacent said other race, said base portion and said second cage having registering openings therein, sprags disposed in said openings with the opposite ends thereof projecting from said cages for engaging said races, said base portion and said second cage having a second set of registering openings, bearing members disposed in said second set of openings with the opposite ends thereof projecting from said cages for slidably engaging said races, shoulder means on said bearing members engaging one of said cages for carrying said cages concentric with said races, and springs carried by said bearing members for biasing said cages in circumferentially opposite directions.

8. A one way clutch adapted to be disposed between a pair of coaxial races, said clutch comprising an inner cage having a cylindrical base portion and a pair of flanges projecting radially outwardly from the opposite sides of said base portion, an outer cage concentric with said inner cage carried on said flanges, said base portion and said second cage having registering openings therein, sprags disposed in said openings with the opposite ends thereof projecting from said cages for engaging said races, spring means disposed between said cages engaging said sprags and biasing said opposite ends for engagement with said races, said base portion and said second cage having a second set of registering openings, bearing members disposed in said second set of openings with the opposite ends thereof projecting from said cages for slidably engaging said races, shoulder means on said bearing members engaging one of said cages for carrying said cages concentric with said races, and springs carried by said bearing members for biasing said cages in circumferentially opposite directions.

9. A one way clutch adapted to be disposed between a pair of coaxial races, said clutch comprising a pair of relatively rotatable cages adapted to be disposed between and in spaced relation to said races, one of said cages being journalled on the other cage, a plurality of sprags slidably extending through corresponding cage apertures for engagement with said races, circumferentially spaced bearing members slidably extending through the cages and having opposite ends for slidable engagement with the races, and spring actuated means carried by the bearing members and biasing said relatively rotatable cages in opposite directions to yieldably urge said sprags towards engagement with the races.

References Cited in the file of this patent
UNITED STATES PATENTS

| | | |
|---|---|---|
| 2,399,749 | Lund | May 7, 1946 |
| 2,404,221 | Dodge | July 16, 1946 |